(12) United States Patent
Nomura

(10) Patent No.: US 6,713,669 B2
(45) Date of Patent: Mar. 30, 2004

(54) THERMOELECTRIC CONVERSION COMPONENT

(75) Inventor: Tadashi Nomura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 208 days.

(21) Appl. No.: 09/981,105

(22) Filed: Oct. 17, 2001

(65) Prior Publication Data

US 2002/0069908 A1 Jun. 13, 2002

(30) Foreign Application Priority Data

Oct. 19, 2000 (JP) .................... 2000-319432

(51) Int. Cl.[7] .............. H01L 35/02; H01L 35/28; H01L 35/00
(52) U.S. Cl. ................ 136/232; 136/225; 136/229
(58) Field of Search ................ 136/225, 226, 136/229, 230, 232

(56) References Cited

U.S. PATENT DOCUMENTS 6,565,254 B2 * 5/2003 Sato et al. .............. 374/132

FOREIGN PATENT DOCUMENTS

JP 3-117739 12/1991
JP 2526247 6/1996

* cited by examiner

Primary Examiner—Patrick Ryan
Assistant Examiner—Thomas H. Parsons
(74) Attorney, Agent, or Firm—Keating & Bennett, LLP

(57) ABSTRACT

A thermoelectric conversion component includes a substrate having a cavity. An insulating film is formed on the upper surface of the substrate. A small heat-capacity region is formed in the center of the insulating film, and a large heat-capacity region is formed in the outer peripheral portions of the substrate and the insulating film. A thermoelectric pattern is formed on the upper surface of the insulating film so that hot junctions and cold junctions are respectively placed on the small heat-capacity region and the large heat-capacity region. Thermosensitive resistor patterns are formed on the outer peripheries of the cold junctions of the thermoelectric pattern.

3 Claims, 4 Drawing Sheets

THERMOELECTRIC CONVERSION COMPONENT

BACKGROUND OF THE INVENTION

1. Field of the Invention

The present invention relates to a thermoelectric conversion component, and more particularly, to a thermoelectric conversion component in which an output signal from a thermoelectric pattern is subjected to temperature compensation.

2. Description of the Related Art

As the background of the present invention, a conventional thermoelectric conversion component is disclosed in, for example, Japanese Patent No. 2526247 and Japanese Unexamined Utility Model Application Publication No. 3-117739.

FIG. 5 is a plan view of a conventional thermoelectric conversion component disclosed in Japanese Patent No. 2526247. In a thermoelectric conversion component 1 shown in FIG. 5, a thermosensitive resistor pattern 4 for temperature compensation is formed at the corner of a substrate 2 at a distance from a thermoelectric pattern 3.

FIGS. 6 and 7 are a plan view and a front view, respectively, of a conventional thermoelectric conversion component disclosed in Japanese Unexamined Utility Model Application Publication No. 3-117739. In a thermoelectric conversion component 1 shown in FIGS. 6 and 7, a thermosensitive resistor pattern 4 for temperature compensation is formed between a substrate 2 and cold junctions of a thermoelectric pattern 3. An insulating film 5 is interposed between the cold junctions of the thermoelectric pattern 3 and the thermosensitive resistor pattern 4.

In the thermoelectric conversion component 1 shown in FIG. 5, since the output from the thermoelectric pattern 3 varies with the temperatures of the cold junctions of the thermoelectric pattern 3, it is necessary to precisely detect the temperatures of the cold junctions in order to precisely measure an absolute temperature. Since the thermosensitive resistor pattern 4 for temperature compensation is formed at the corner of the substrate 2, however, when the temperature distribution of the substrate 2 is not uniform, the temperatures of the cold junctions cannot be detected precisely. This makes precise temperature compensation impossible, and leads to an increase in errors.

In the thermoelectric conversion component 1 shown in FIGS. 6 and 7, since the thermosensitive resistor pattern 4 for temperature compensation is placed under the cold junctions of the thermoelectric pattern 3, the thermoelectric pattern 3 must cross stepped portions formed by the thermosensitive resistor pattern 4, and therefore, it is prone to breakage. The thermoelectric pattern 3 does not function properly even if it has only one break. This results in a decrease in reliability and manufacturing throughput.

SUMMARY OF THE INVENTION

Accordingly, it is a main object of the present invention to provide a thermoelectric conversion component in which the temperatures of the cold junctions of a thermoelectric pattern can be precisely measured even when the temperature distribution is not uniform, so that reliability and manufacturing throughput can be improved.

In order to achieve the above object, according to an aspect of the present invention, there is provided a thermoelectric conversion component including a small heat-capacity region, a large heat-capacity region, and a thermoelectric pattern including a hot junction provided on said small heat-capacity region and a cold junction provided on said large heat-capacity region, wherein a thermosensitive resistor pattern for detecting the temperature of the cold junction is arranged on the same plane as the thermoelectric pattern, along the outer periphery of the cold junction, and adjacent to only a portion where the cold junction is formed.

Preferably, the cold junction and the thermosensitive resistor pattern may be covered with an insulating film having a high thermal conductivity.

According to another aspect of the present invention, there is provided a thermoelectric conversion component including a small heat-capacity region, a large heat-capacity region, a thermoelectric pattern including a hot junction provided on said small heat-capacity region and a cold junction provided on said large heat-capacity region, and a protective film covering the thermoelectric pattern, wherein a thermosensitive resistor pattern for detecting the temperature of the cold junction is arranged on the protective film, along the outer periphery of the cold junction, and adjacent to only a portion where the cold junction is formed.

In the thermoelectric conversion component of the present invention, since the thermosensitive resistor pattern is formed on the outer periphery of the cold junction of the thermoelectric pattern and adjacent to only the portion where the cold junction is formed, the resistance of the thermosensitive resistor pattern reflects temperature distribution information in a manner similar to thermoelectromotive forces. For this reason, even when the temperature distribution is not uniform, it is possible to precisely detect the temperature of the cold junction, to perform precise temperature compensation, and to improve the measurement accuracy of the thermoelectric pattern.

Since the thermoelectric pattern and the thermosensitive resistor pattern are flush with each other, and do not cross the stepped portion, reliability and manufacturing throughput can be improved.

By covering the cold junction and the thermosensitive resistor pattern with the insulating film having a high thermal conductivity, the conduction of heat between the cold junction of the thermoelectric pattern and the thermosensitive resistor pattern is improved, and the temperature difference therebetween is reduced. For this reason, the thermosensitive resistor pattern can precisely detect the temperature of the cold junction, more precise temperature compensation is possible, and the measurement accuracy of the thermoelectric pattern can be further improved.

Further objects, features, and advantages of the present invention will become apparent from the following description of the preferred embodiments with reference to the attached drawings.

DESCRIPTION OF THE PREFERRED EMBODIMENTS

Figure 1:
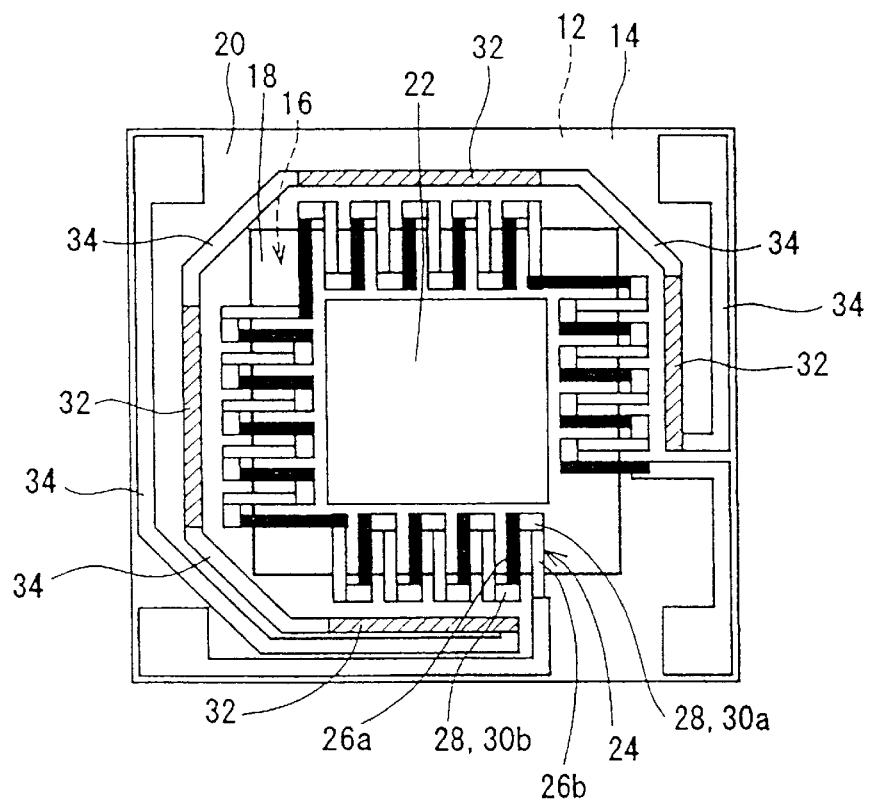
FIG. 1 is a plan view of a thermoelectric conversion component according to a first embodiment of the present invention.
Figure 2:
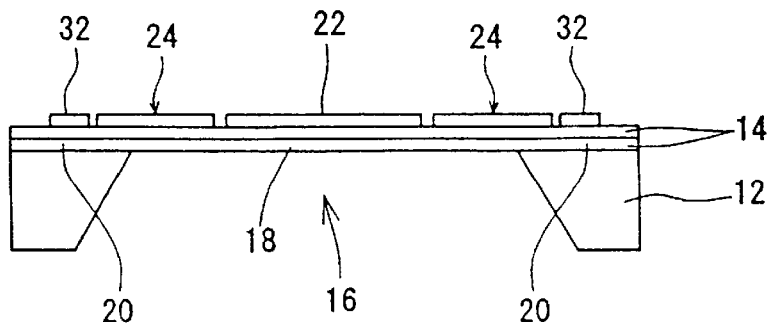
FIG. 2 is a front view of the thermoelectric conversion component shown in FIG. 1.

FIGS. 1 and 2 are a plan view and a front view, respectively, of a thermoelectric conversion component according to a first embodiment of the present invention. A thermoelectric conversion component 10 shown in FIGS. 1 and 2 includes a substrate 12 shaped like a rectangular plate and made of, for example, Si. A monolayer or multilayer insulating film 14 made of an insulating material, such as $SiO_2$, $Al_2O_3$, or AlN, is formed on the upper surface of the substrate 12. A cavity 16 is formed in the substrate 12 by removing a portion of the substrate 12 corresponding to a rectangular center portion of the insulating film 14 from below by, for example, anisotropic etching. Thereby, a small heat-capacity region 18 is formed in the removed portion of the substrate 12, that is, in the center portion of the insulating film 14, and a large heat-capacity region 20 is formed in the remaining portion of the substrate 12, that is, on the outer peripheral portions of the substrate 12 and the insulating film 14. In other words, the large heat-capacity region 20 is formed around the small heat-capacity region 18.

An infrared absorber 22 is formed on the center of the upper surface of the center of the insulating film 14, that is, of the small heat-capacity region 18.

A thermoelectric pattern 24 is formed around the infrared absorber 22 on the upper surface of the insulating film 14. The thermoelectric pattern 24 includes a plurality of N-type thermoelectric material patterns 26a and a plurality of P-type thermoelectric material patterns 26b. The N-type thermoelectric material patterns 26a and the P-type thermoelectric material patterns 26b are alternately connected in series via a plurality of connecting patterns 28 formed on the insulating film 14. Hot junctions 30a of the thermoelectric pattern 24 are placed on the small heat-capacity region 18, and cold junctions 30b thereof are placed on the large heat-capacity region 20.

Thermosensitive resistor patterns 32 are formed on the large heat-capacity region 20 and around the thermoelectric pattern 24 on the upper surface of the insulating film 14. In this case, the thermosensitive resistor patterns 32 are formed only in the portions extending along the outer peripheries of the cold junctions 30b of the thermoelectric pattern 24. The thermosensitive resistor patterns 32 serve to detect the temperatures of the cold junctions 30b of the thermoelectric pattern 24, and are connected in series by connecting patterns 34. The connecting patterns 34 are formed on the insulating film 14 and are made of a metal material having a temperature coefficient of resistance lower than that of the material of the thermosensitive resistor patterns 32.

In the thermoelectric conversion component 10 shown in FIGS. 1 and 2, the thermoelectric pattern 24 outputs a voltage corresponding to the sum of thermoelectromotive forces generated in proportion to the temperature differences between the hot junctions 30a and the cold junctions 30b. When heat is not transferred uniformly to the substrate 12, the temperature distribution of the large heat-capacity region 20 is also not uniform. In this case, a large amount of thermoelectromotive force is generated in a low-temperature area of the substrate 12 because the temperature difference between the hot junction 30a and the cold junction 30b is large. In contrast, a small amount of thermoelectromotive force is generated in a high-temperature area of the substrate 12 because the temperature difference between the hot junction 30a and the cold junction 30b is small. Since the output of the thermoelectric pattern 24 corresponds to the sum of the thermoelectromotive forces, it reflects the temperature distribution of the substrate 12.

Since the thermosensitive resistor patterns 32 are arranged along and adjacent to all the cold junctions 30b, the resistances thereof reflect the same temperature distribution information as the thermoelectromotive forces do. For this reason, even if the temperature distribution of the substrate 12 is not uniform, it is possible to precisely detect the temperatures of the cold junctions 30b, to make precise temperature compensation, and to improve the measurement accuracy of the thermoelectric pattern 24.

Furthermore, since the connecting patterns 34 made of a metal material having a low temperature coefficient of resistance are placed in the portions which are not formed along the cold junctions 30b, the portions are not affected by the temperature distribution, and the resistances reflect the temperature distribution only at the cold junctions 30b. That is, since temperature compensation needs the resistances reflecting the temperature distribution only at the cold junctions 30b, it can be made more precise, thereby improving the measurement accuracy of the thermoelectric pattern 24.

The thermoelectric pattern 24 and the thermosensitive resistor patterns 32 are formed on the same plane having no stepped portion, and therefore, it is possible to improve reliability and manufacturing throughput.

Figure 3:
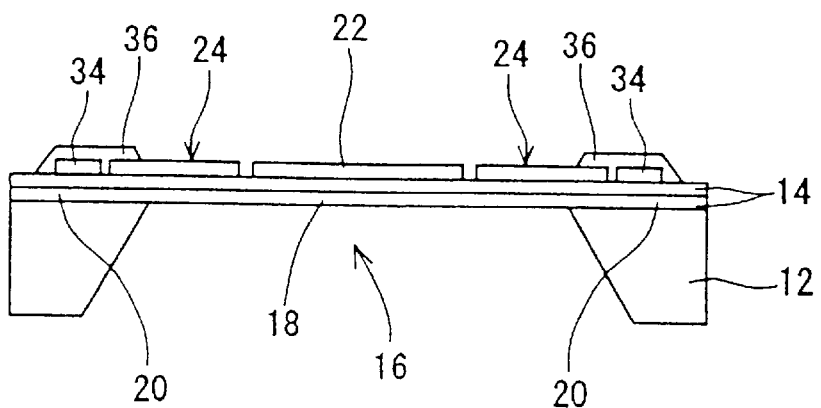
FIG. 3 is a front view of a thermoelectric conversion component according to a second embodiment of the present invention.

FIG. 3 is a front view of a thermoelectric conversion component according to a second embodiment of the present invention. In contrast to the thermoelectric conversion component 10 shown in FIGS. 1 and 2, in a thermoelectric conversion component 10 shown in FIG. 3, cold junctions 30b of a thermoelectric pattern 24 and thermosensitive resistor patterns 32 are covered with an insulating film 36 having a high thermal conductivity, such as $Al_2O_3$ or AlN.

In addition to advantages similar to those of the thermoelectric conversion component 10 shown in FIGS. 1 and 2, the thermoelectric conversion component 10 shown in FIG. 3 makes it possible to improve the conduction of heat between the cold junctions 30b of the thermoelectric pattern 24 and the thermosensitive resistor patterns 32 and to reduce the temperature differences therebetween. For this reason, the thermosensitive resistor patterns 32 can more precisely detect the temperatures of the cold junctions 30b, more precise temperature compensation is possible, and the measurement accuracy of the thermoelectric pattern 24 is further improved.

Figure 4:
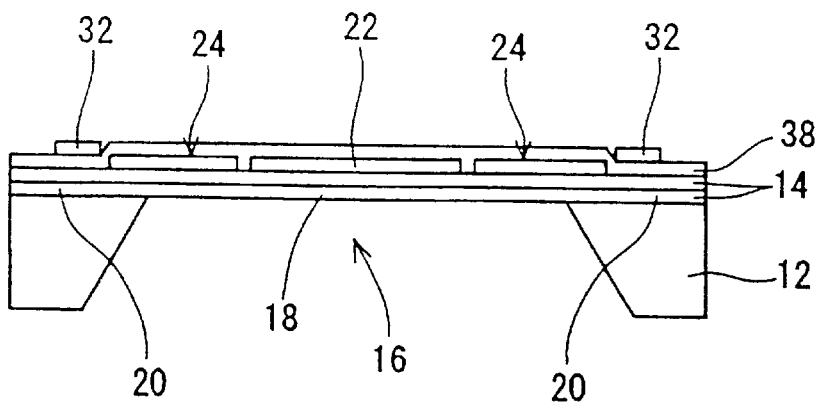
FIG. 4 is a front view of a thermoelectric conversion component according to a third embodiment of the present invention.
Figure 5:
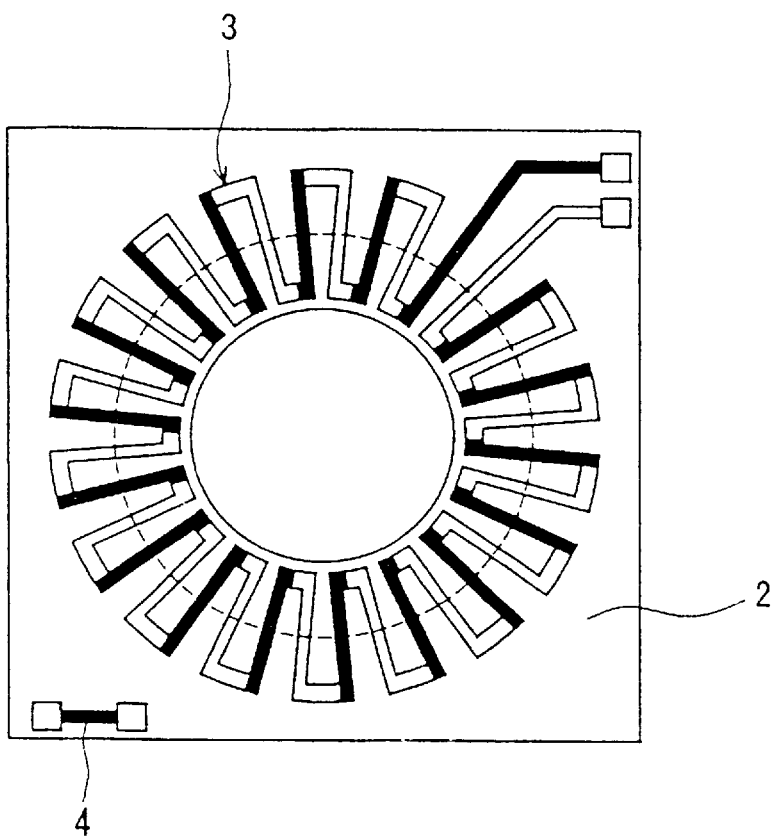
FIG. 5 is a plan view of an example of a conventional thermoelectric conversion component.
Figure 6:
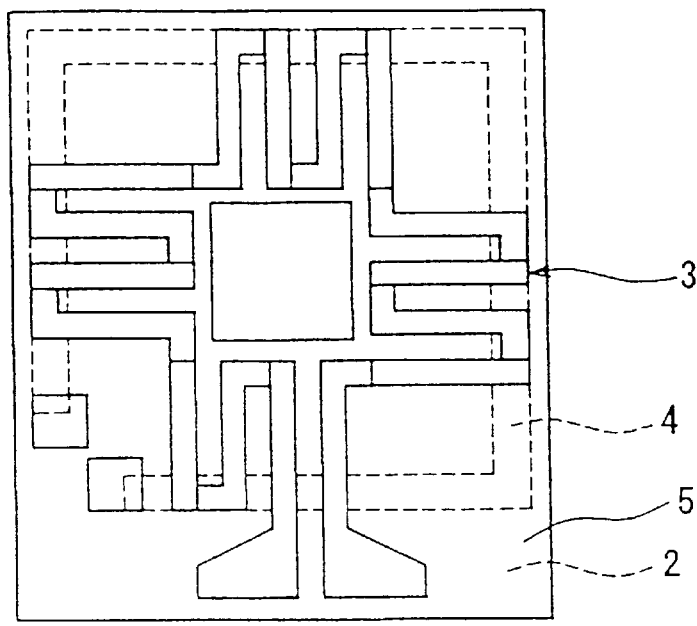
FIG. 6 is a plan view of another example of a conventional thermoelectric conversion component.
Figure 7:
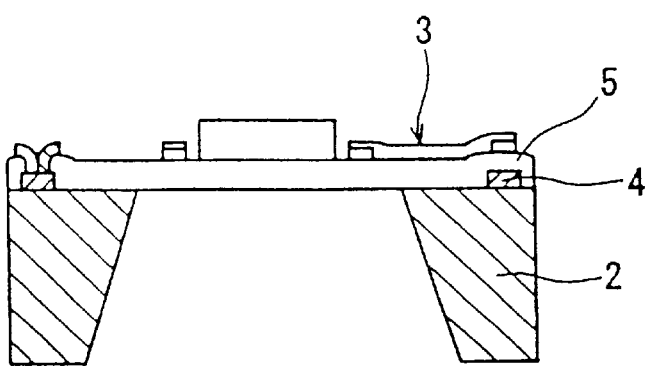
FIG. 7 is a front view of the thermoelectric conversion component shown in FIG. 6.

FIG. 4 is a front view of a thermoelectric conversion component according to a third embodiment of the present invention. In contrast to the thermoelectric conversion component 10 shown in FIGS. 1 and 2, in a thermoelectric conversion component 10 shown in FIG. 4, a protective film 38 is formed between an insulating film 14, an infrared absorber 22, and a thermoelectric pattern 24, and thermosensitive resistor patterns 32 and connecting patterns 34. The thermoelectric conversion component 10 of this embodiment also provides advantages similar to those of the thermoelectric conversion component 10 shown in FIGS. 1 and 2.

While the small heat-capacity region 18 and the infrared absorber 22 are shaped like a rectangular plate in the above-described thermoelectric conversion components 10, they may have other shapes, for example, may be shaped like a disk.

According to the present invention, it is possible to provide a thermoelectric conversion component in which the temperatures of the cold junctions of a thermoelectric pattern can be precisely detected even when the temperature distribution is uniform, so that reliability and manufacturing throughput can be improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A thermoelectric conversion component comprising:

a small heat-capacity region;

a large heat-capacity region; and a thermoelectric pattern including a hot junction provided on said small heat-capacity region and a cold junction provided on said large heat-capacity region, wherein a thermosensitive resistor pattern for detecting the temperature of said cold junction is arranged on the same plane as said thermoelectric pattern, along the outer periphery of said cold junction, and adjacent to only a portion where said cold junction is formed.

2. A thermoelectric conversion component according to claim 1, wherein said cold junction and said thermosensitive resistor pattern are covered with an insulating film having a high thermal conductivity.

3. A thermoelectric conversion component comprising:

a small heat-capacity region;

a large heat-capacity region;

a thermoelectric pattern including a hot junction provided on said small heat-capacity region and a cold junction provided on said large heat-capacity region; and a protective film covering said thermoelectric pattern, wherein a thermosensitive resistor pattern for detecting the temperature of said cold junction is arranged on said protective film, along the outer periphery of said cold junction, and adjacent to only a portion where said cold junction is formed.

* * * * *